US00RE35532E

United States Patent [19]

Duren

[11] E Patent Number: Re. 35,532

[45] Reissued Date of Patent: Jun. 17, 1997

[54] AIR ADMITTANCE VALVE FOR RESISTING HIGH INTERNAL PRESSURE

[76] Inventor: Gary S. Duren, 6812 Camp Rd., Keystone Heights, Fla. 32656

[21] Appl. No.: 360,402

[22] Filed: Dec. 21, 1994

Related U.S. Patent Documents

Reissue of:

[64] Patent No.: 5,273,068
Issued: Dec. 28, 1993
Appl. No.: 48,192
Filed: Apr. 20, 1993

[51] Int. Cl.[6] ..... F16K 15/08

[52] U.S. Cl. ..... 137/526; 137/516.15; 137/533.27

[58] Field of Search ..... 137/516.15–516.23, 137/217, 526, 533.27; 4/211, 219

[56] References Cited

U.S. PATENT DOCUMENTS

| | | | |
|---|---|---|---|
| 982,677 | 1/1911 | Householder | 137/516.21 |
| 1,578,766 | 3/1926 | Schwemlein | 137/526 X |
| 2,872,938 | 2/1959 | Hansen et al. | 137/526 X |
| 2,928,413 | 3/1960 | Hansen | 137/526 X |
| 3,807,444 | 4/1974 | Fortune . | |
| 3,923,081 | 12/1975 | Persson | 137/526 X |
| 4,232,706 | 11/1980 | Ericson | 137/526 X |
| 4,436,107 | 3/1984 | Persson | 137/526 X |
| 4,493,339 | 1/1985 | Porter . | |
| 4,535,807 | 8/1985 | Ericson | 137/526 X |
| 4,545,398 | 10/1985 | van Olst . | |
| 4,643,221 | 2/1987 | Parker | 137/526 X |
| 4,696,263 | 9/1987 | Boyesen . | |
| 4,867,802 | 9/1989 | Earl . | |
| 5,048,562 | 9/1991 | Frawley | 137/526 X |

FOREIGN PATENT DOCUMENTS

| | | | |
|---|---|---|---|
| 0409506 | 1/1991 | European Pat. Off. | 4/219 |

*Primary Examiner*—John Rivell
*Attorney, Agent, or Firm*—Renner, Otto, Boisselle & Sklar, P.L.L.

[57] ABSTRACT

An air admittance valve device is disclosed for enabling valve sealing member to remain securely closed against high pressure in a pipe or duct produced from: equipment connected to said pipe or duct e.g. a hydraulic pipeline flusher device; fluid movement within, or as otherwise introduced to system of pipe or duct while further remaining tightly closed at normal atmospheric pressure (equilibrium) and equalizing pressure excursions that are below atmospheric pressure occurring within sanitary drainage pipes or room ventilation ducts by admitting air to said pipe or duct.

21 Claims, 3 Drawing Sheets

AIR ADMITTANCE VALVE FOR RESISTING HIGH INTERNAL PRESSURE

Matter enclosed in heavy brackets [ ] appears in the original patent but forms no part of this reissue specification; matter printed in italics indicates the additions made by reissue.

BACKGROUND OF THE INVENTION

The invention disclosed herein relates to an air admittance valve designed for connection to a pipe or duct where pressure excursions that are much greater than normal atmospheric pressure and which are lower than atmospheric pressure occur thus providing a need for the introduction of air from the outside of said duct or pipe via the valve without allowing the reverse flow of the air inside said duct or pipe when pressure in said pipe or duct is equalized or risen.

Sanitary drainage systems for buildings incorporate a network of pipes for conveying waste materials out of the building. At each point of conveyance most U.S. building codes require a certain water trap containing at the minimum requirement a two inch column of water which thereby prevents the passage of foul contaminated air into the building via the sanitary piping system. The primary reason that water seals in traps connected to said sanitary pipe must be protected is spent water discharged into the drainage system causes interaction with air at the air-water interface inside said pipe. A portion of the energy from the moving water is transferred to air setting it into motion. This flow of air at the core of said pipe in vertical drainage piping and at top of said pipe in horizontal branch piping generates a negative pressure excursion as it moves through the sanitary system. If said negative pressure exceeds the allowable limit defined by codes, water trap seal loss by siphonage will occur at an unacceptable level.

Air admittance valve devices are known (U.S. Pat. Nos. 3,923,081 and 4,232,706) for allowing air to enter sanitary pipework within buildings but prevent the passage of contaminated air outwardly from the piping system via the device during normal sanitary use conditions. These devices replace ventilation pipes and prevent said vent pipe from penetrating building structural components and ultimately the roofing membrane.

Technology in known art disclose various devices that rely on suitable elastomeric valve sealing members, said valve members rest against seats by the force of springs, weight or otherwise and open automatically when air is required in the sanitary piping system upon the force of vacuum. Valve sealing member is normally biased against valve seats, so when internal pressure is equalized within the piping system said valve member engages the seats thus prevents foul air from passing out therefrom.

The object and novelty of this invention is to provide a device capable of overcoming important problems associated with the practical installation and use of such air valves. The problems are as follows:

1. The valve mechanism must not fail when it is exposed to high pressure excursions, such as produced by testing the sanitary piping system with water, when said piping is filled, the resulting head pressure can exceed 50 pounds per square inch.

U.S. building codes require sanitary pipe systems to be tested prior to the installation of fixtures or appurtenances. e.g. water closet, lavatory, or sinks. The purpose of the test is to insure that all joints between pipes are indeed tight, so the inspector can certify system integrity under the applicable code assuring health and safety. One means of required test specifies a method by which all points of the drainage pipe network are to be subjected to minimum pressure that equals a ten foot column of water (4.33 p.s.i.). This mark being the minimum it is routine that the entire system is filled with water and resulting head pressure within the pipe can then exceed 50 p.s.i. However, the codes do not address maximum pressure regulations for said testing.

2. The method by which the device is connected to the intended pipe must satisfy the national model building codes and high pressure, such as produced by equipment designed to clear blockages that can occur in said sanitary pipe system.

During the life of any sanitary system, it is highly probable that a drain blockage will occur at some point within said system. One way of clearing such an obstruction, includes a method that converts ordinary water into a powerful, directed force by means of a hydraulic pipeline flusher device. This equipment will produce pressure between 30 and 100 p.s.i. in a sudden burst.

3. The valve must be resistant to extreme atmospheric conditions which produce excessive pressure in building ventilation ducts resulting in undesirable reverse flow of fluid in said duct.

Device sealing mechanisms disclosed in prior known art are particularly and inherently susceptible to high pressure failures caused by the examples above acting against disclosed elastomeric valve members said failure caused from inordinate distortion of said mechanism. Failure occurs when elastic sealing members disclosed deform under high pressure transmitted within the pipe to a point where valve seal breaches under said pressure. Said member when stretched by the force of pressure is forced downwardly and becomes trapped between the seats thus rendering the entire valve mechanism inoperable with said sealing member lodged to any extent. Contaminated fluid may then pass from the pipe via the device valve mechanism to surrounding atmosphere. Both instances of high pressure cited above occur everyday and the probability that an air valve will be subjected to the same is great.

The current invention solves the problem associated with the deformation of elastomeric materials described in prior art, caused by excessive pressure, by disclosing a more reliable device that is capable of resisting excessive internal pressure. The intended function of preventing contaminated air from within the sanitary system via the valve, is now shown to be more reliably and securely maintained.

DESCRIPTION OF DRAWINGS

Other objects, features and advantages of the present invention will become more apparent from the following detailed description of the preferred embodiments and certain modifications thereof when taken together with the accompanying drawings, in which.

DESCRIPTION OF PREFERRED EMBODIMENTS

Figure 2:
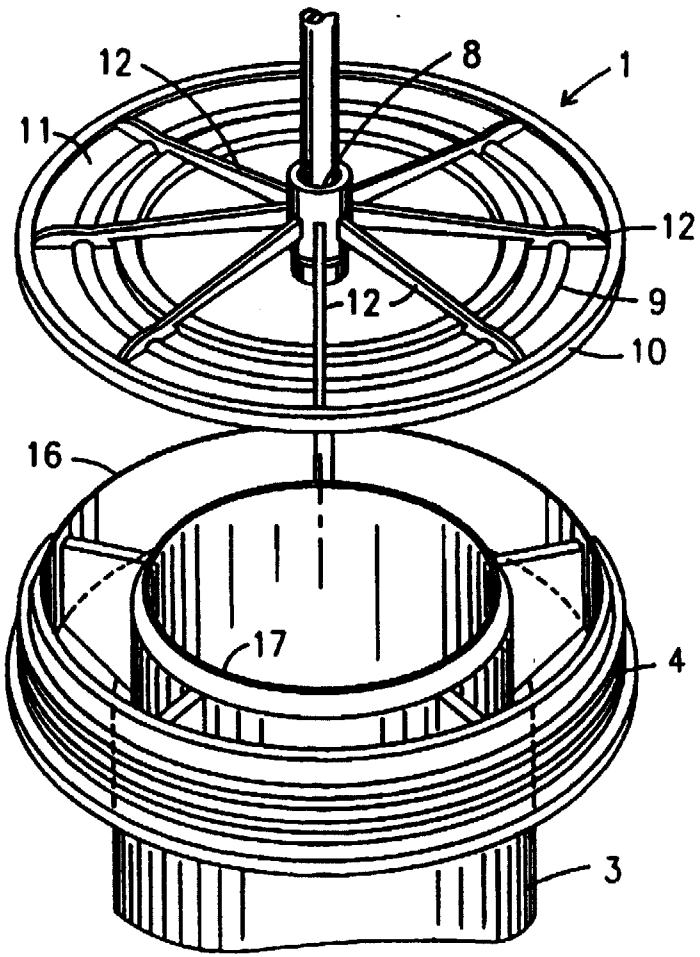
FIG. 2. Exploded isometric view illustrating rigid annular sealing disk member with elastomeric membrane envelope and concentric seats in accordance with FIG. 1.
Figure 1:
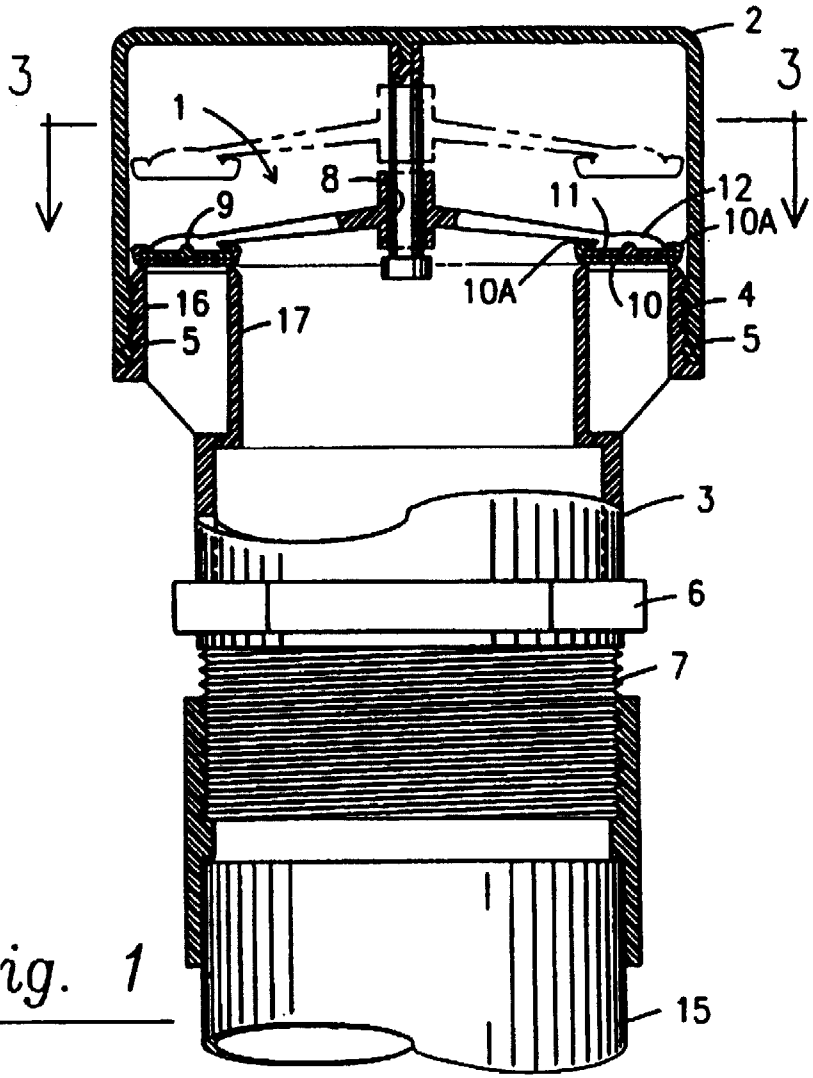
FIG. 1 Cross-section of device in accordance with invention illustrating a rigid annular sealing disk member with elastomeric membrane, the valve is shown in the normally closed position, with phantom lines representing the open position.
Figure 6:
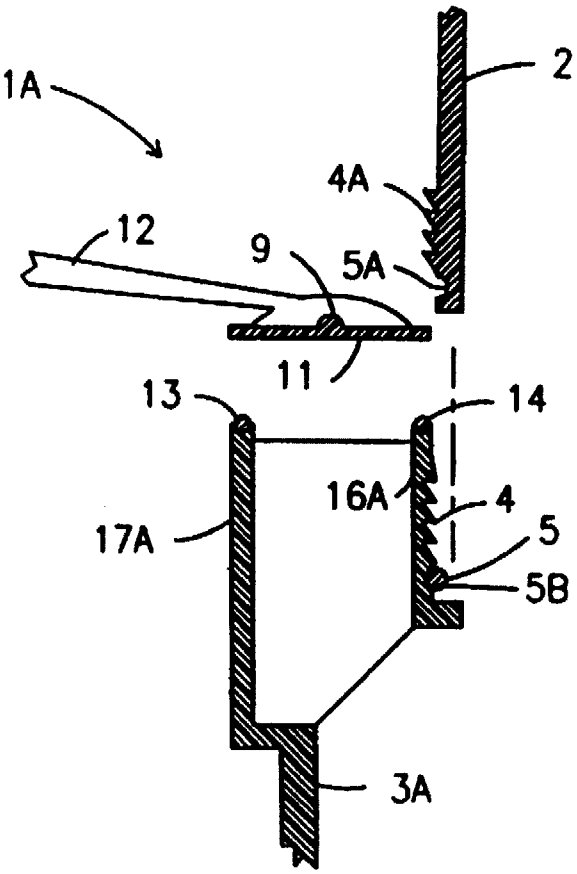
FIG. 6. Exploded cross-section in accordance with FIG. 4 illustrating barbs in cap and reverse oriented barbs on lower body and o-ring seal between the two parts.
Figure 3:
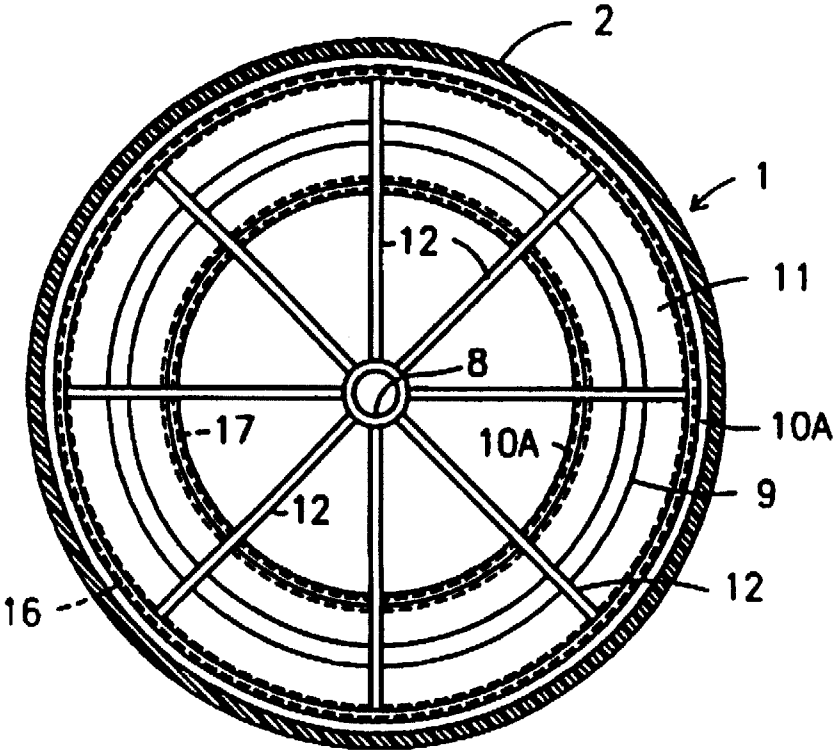
FIG. 3. Sectional top view along line 3—3 of rigid sealing disk member with elastomeric membrane envelope inside cap in accordance with FIG. 1.

The invention is explained in detail while referring to the figures which show embodiment examples of an air admittance valve for resisting high internal pressure. In accordance with the invention, this is accomplished by an air admittance valve, adapted to be affixed to a sanitary drainage vent pipe 15, said valve opening to admit outside air into said pipe 15 upon the presence of a pressure drop within said pipe 15. Referring to FIG. 1, said valve comprised of a tubular body member 3 having upper and lower ends, means provided at the lower end for affixing said body to and in communication with a sanitary vent pipe 15, the upper tubular body being provided with inner 17 and outer 16 concentric valve seats, a cap 2 is mounted on the upper end of said tubular body by means of barbs 4A provided on an inner cap surface which mate with reversely oriented barbs 4 provided on an outer surface of the tubular body member (FIG. 6). Said cap 2 on the upper end of tubular body 3 encompasses said inner 17 and outer 16 seats to form a chamber. A sealing member 1 (FIG. 1 and 2.) is mounted for movement within said valve chamber comprised of an annular *valve* disk 11 constructed of rigid material structurally reinforced by ribs 12 [extending inwardly and outwardly radially to a central aperture 8, said] *integral with substantially the full radial extent of the upper side of the valve disk 11 and extending radially inwardly from the valve disk to a central support 8, which comprises a ring having a central aperture therein. The* annular disk 11 [being] *is* further structurally [reinforces] *reinforced* by a concentric rib 9 formed on said annular sealing *valve* disk 11, an elastomeric membrane envelope 10 is wrapped around the annular valve disk 11 *intermediate the radial extent of the upper side of the valve disk*, to fully cover the side of said annular disk which faces the inner 17 and outer 16 concentric valve seats and to partially cover the other side 10A[; said]. *The* annular valve disk 11 maintains sealing engagement with said inner 17 and outer 16 valve seats during an increase in pressure or at equilibrium within said pipe 15 and chamber, thus preventing the escape of fluid from said pipe 15 to atmosphere, while said sealing member 1 automatically opens upon a pressure drop to admit air from the surrounding atmosphere to a sanitary vent pipe 15 or ventilation duct. The lower end of said air admittance valve is provided with standard pipe threads 7 for securing the body to said sanitary vent pipe 15 and a surface projection 6 suitable for engagement with a wrench. (FIG. 1, 2 and 3)

Figure 5:
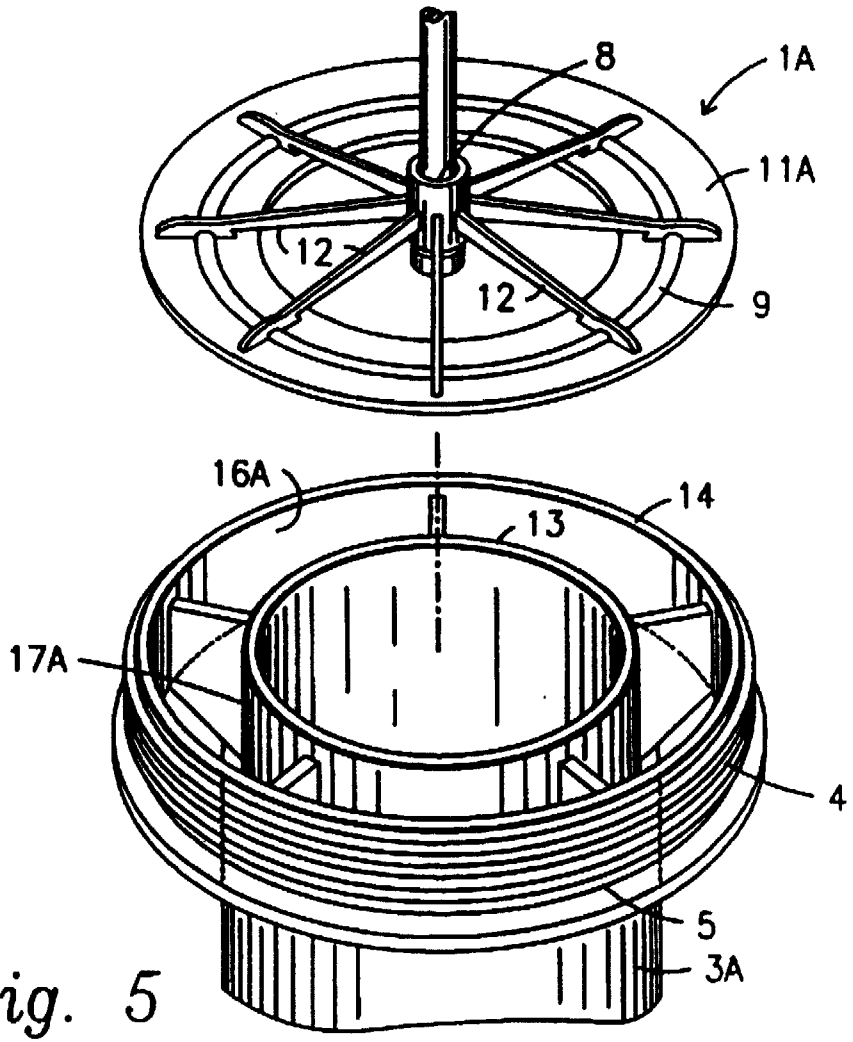
FIG. 5 Exploded isometric view illustrating rigid annular sealing disk member with o-rings in concentric seats in accordance with FIG. 4.
Figure 4:
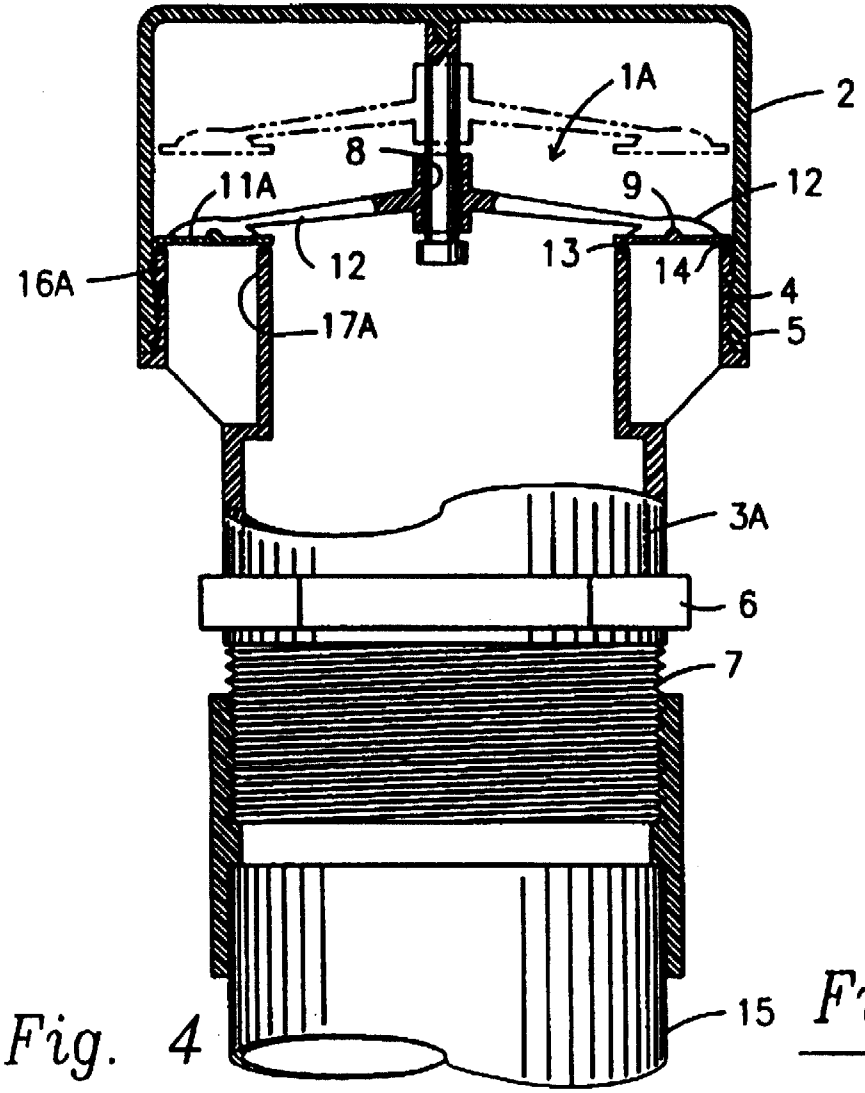
FIG. 4. Cross-section of device in accordance with invention illustrating a rigid annular sealing disk member resting on o-rings held securely in inner and outer concentric seats, the valve is shown in the normally closed position, with phantom lines representing the open position.

Referring to FIG. 4 another embodiment example of an air admittance valve, adapted to be affixed to a sanitary drainage vent pipe 15 is shown, said valve opening to admit outside air into said pipe 15 upon the presence of a pressure drop within said pipe 15, said valve comprised of a tubular body member 3A having upper and lower ends, means provided at the lower end for affixing said body to and in communication with a sanitary vent pipe 15, the upper tubular body being provided with inner 17A and outer 16A concentric valve seats, an o-ring 13 and 14 is mounted on the top surface of each said inner 17A and outer 16A concentric valve seats. A cap 2 is mounted on the upper end of said tubular body by means of barbs 4A provided on an inner cap surface which mate with reversely oriented barbs 4 provided on an outer surface of the tubular body member 3A (FIG. 6). Said cap 2 on the upper end of tubular body 3A encompasses said inner 17A and outer 16A seats to form a chamber. A sealing member 1A (FIG. 4 and 5.) is mounted for movement within said valve chamber comprised of an annular disk 11A constructed of rigid material structurally reinforced by ribs 12 extending inwardly and outwardly radially to a central [apertures] *support* 8, said annular disk being further structurally reinforced by a concentric rib 9 formed on the annular sealing disk 1A, said annular valve [disk] *member* 11A maintains sealing engagement with said inner 17A and outer 16A valve seat o-rings during an increase in pressure or at equilibrium within said pipe 15 and chamber, thus preventing the escape of fluid from said pipe 15 to atmosphere, while said sealing member 1A automatically opens upon a pressure drop to admit air from the surrounding atmosphere to sanitary vent pipe 15 or ventilation duct. The air admittance valve at the lower end of the tubular body member is provided with standard pipe threads for securing the body to said sanitary vent pipe 15, and with a surface projection suitable for engagement with a wrench. (FIG. 4, 5 and 6)

In accordance with the invention, the figures and description above on which, I claim:

1. An air admittance valve adapted to be affixed to a sanitary drainage vent pipe, said valve opening to admit outside air into said pipe upon presence of a pressure drop within said pipe, said valve comprising:

(a) a tubular body member having upper and lower ends, means provided at the lower end for affixing the tubular body *member* to and in communication with said sanitary *drainage* vent pipe [with said sanitary vent pipe], the upper end *of the* tubular body *member* being provided with inner and outer concentric valve seats;

(b) a cap *member* mounted on the upper end of said tubular [valve] body member encompassing said inner and outer *concentric* valve seats and forming a valve chamber, said cap member being secured to the tubular body member by means of barbs provided on an inner cap surface which mate with reversely oriented barbs provided on an outer surface of the tubular body member;

(c) an annular disk valve member mounted for movement within said valve chamber and normally resting upon said inner and outer concentric valve seats, [and] *said* annular disk *valve member* being formed of rigid material and structurally reinforced by an annular concentric rib formed on the annular disk *valve member* and by ribs extending inwardly and upwardly from the *annular* disk *valve member* to a ring having a central aperture;

(d) an elastomeric sealing membrane wrapped around the annular [valve] disk *valve member* to fully cover [the] *a* side of said annular [valve] disk *valve member* which faces the inner and outer concentric valve seats and to partially cover the other side of the annular [valve] disk *valve member*;

said annular disk *valve* member maintaining sealing engagement with said inner and outer *concentric* valve seats during an increase in pressure within said pipe and valve chamber, thus preventing the escape of fluid from said pipe to atmosphere.

2. An air admittance valve as in claim 1 in which the lower end of the tubular body member is provided with standard pipe threads for securing the *tubular* body *member* to said sanitary *drainage* vent pipe, and with a surface projection suitable for engagement with a wrench.

3. An air admittance valve adapted to be affixed to a sanitary drainage vent pipe, said valve opening to admit outside air into said pipe upon presence of a pressure drop within said pipe, said valve comprising:

(a) a tubular body member having upper and lower ends, means provided at the lower end for affixing the tubular body *member* to and in communication with said sanitary *drainage* vent pipe [with said sanitary vent pipe], the upper end *of the* tubular body *member* being provided with inner and outer concentric valve seats;

(b) a cap *member* mounted on the upper end of said tubular [valve] body member encompassing said inner and outer *concentric* valve seats and forming a valve chamber, said cap member being secured to the tubular body member by means of barbs provided on an inner cap surface which mate with reversely oriented barbs provided on an outer surface of the tubular body member;

(c) an annular disk valve member mounted for movement within said valve chamber and normally resting upon said inner and outer concentric valve seats, said annular disk *valve member* being formed of rigid material and structurally reinforced by an annular concentric rib formed on the annular disk *valve member* and by ribs extending inwardly and upwardly from the *annular* disk *valve member* to a ring having a central aperture;

(d) an o-ring mounted on the top surface of each said inner and outer concentric valve seats; said annular disk *valve* member maintaining sealing engagement with [said inner and outer valve seat o-rings] *each said o-ring* during an increase in pressure within said sanitary *drainage* vent pipe and valve chamber, thus preventing the escape of fluid from said pipe to the atmosphere.

4. An air admittance valve as in claim 3 in which the lower end of the tubular body member is provided with standard pipe threads for securing the *tubular* body *member* to said sanitary *drainage* vent pipe, and with a surface projection suitable for engagement with a wrench.

*5. An air admittance valve adapted to be affixed to a sanitary drainage vent pipe, said valve opening to admit outside air into the pipe upon presence of a pressure drop within the pipe, said valve comprising a tubular body member having a lower end adapted to be affixed to and in communication with the pipe, and an upper end provided with inner and outer concentric valve seats, a cap mounted on the upper end encompassing said valve seats and forming a valve chamber, a ring shape valve disk mounted for movement within said valve chamber, said valve disk normally resting upon said valve seats, said valve disk being formed of rigid material having an upper side facing away from said valve seats and a lower side facing said valve seats, said lower side being substantially flat for maintaining sealing engagement with said valve seats during an increase in pressure within said pipe and said valve chamber, said valve disk being structurally reinforced by rib means on said upper side, said rib means including radial ribs extending substantially the full radial extent of said upper side of said valve disk and radially inwardly from said valve disk to a central support, said rib means also including a concentric rib intermediate the radial extent of said upper side of said valve disk.*

*6. An air admittance valve adapted to be affixed to a sanitary drainage vent pipe, said valve opening to admit outside air into the pipe upon presence of a pressure drop within the pipe, said valve comprising a tubular body member having a lower end adapted to be affixed to and in communication with the pipe, and an upper end provided with inner and outer concentric valve seats, a cap mounted on the upper end encompassing said valve seats and forming a valve chamber, a ring shape valve disk mounted for movement within said valve chamber, said valve disk normally resting upon said valve seats, said valve disk being formed of rigid material having an upper side facing away from said valve seats and a lower side facing said valve seats, said lower side being substantially flat for maintaining sealing engagement with said valve seats during an increase in pressure within said pipe and said valve chamber, said valve disk being structurally reinforced by radial ribs on said upper side of said valve disk, and an annular concentric rib intermediate the radial extent of said upper side of said valve disk.*

*7. An air admittance valve as in claim 6 wherein said central support comprises a ring having a central aperture.*

*8. An air admittance valve as in claim 6 further comprising an elastomeric sealing member between said valve disk and said valve seats for maintaining sealing engagement with said valve seats during an increase in pressure within said pipe and said valve chamber.*

*9. An air admittance valve as in claim 8 wherein said sealing member substantially covers said lower side of said valve disk.*

*10. An air admittance valve as in claim 6 further comprising seal members mounted on upper surfaces of said valve seats, said valve disk maintaining sealing engagement with said seal members during an increase in pressure within the pipe and said valve chamber.*

*11. An air admittance valve adapted to be affixed to a sanitary drainage vent pipe, said valve opening to admit outside air into the pipe upon presence of a pressure drop within the pipe, said valve comprising a tubular body member having upper and lower ends, the lower end being adapted to be affixed to and in communication with the pipe, the upper end being provided with inner and outer concentric valve seats, a cap mounted on the upper end encompassing said valve seats and forming a valve chamber, a valve member mounted for movement within said valve chamber and normally resting upon said valve seats, said valve member including an annular disk which is maintained in engagement with said valve seats during an increase in pressure within the pipe and said valve chamber, thus preventing the escape of fluid from the pipe to atmosphere, said annular disk being formed of rigid material having an upper side facing away from said valve seats and a lower side facing said valve seats, said annular disk being structurally reinforced by an annular concentric rib and radial ribs formed on the upper side of the annular disk.*

*12. An air admittance valve as in claim 11 wherein said radial ribs extend inwardly and upwardly from the annular disk to a central support.*

*13. An air admittance valve as in claim 11 wherein said valve member further includes an elastomeric sealing member between said annular disk and said valve seats which maintains sealing engagement between said valve member and said valve seats during an increase in pressure within the pipe and said valve chamber, thus preventing the escape of fluid from said pipe to atmosphere.*

*14. An air admittance valve as in claim 13 wherein said sealing member substantially covers the lower side of said annular disk which faces said valve seats.*

*15. An air admittance valve as in claim 14 wherein said sealing member is wrapped around said annular disk.*

*16. An air admittance valve adapted to be affixed to a sanitary drainage vent pipe, said valve opening to admit outside air into the pipe upon presence of a pressure drop within the pipe, said valve comprising a tubular body member having a lower end adapted to be affixed to and in communication with the pipe, and an upper end provided with inner and outer concentric valve seats, a cap mounted on the upper end encompassing said valve seats and forming a valve chamber, a ring shape valve disk mounted for movement within said valve chamber, said valve disk normally resting upon said valve seats, said valve disk being formed of rigid material having an upper side facing away from said valve seats and a lower side facing said valve seats, said valve disk being structurally reinforced by radial ribs integral with a substantial portion of the radial extent of the upper side of said valve disk.*

*17. An air admittance valve as in claim 16 wherein said radial ribs extend radially inwardly from said valve disk to a central support.*

*18. An air admittance valve as in claim 16 wherein said valve disk is further structurally reinforced by an annular concentric rib formed on the upper side of said valve disk.*

*19. An air admittance valve adapted to be affixed to a sanitary drainage vent pipe, said valve opening to admit outside air into the pipe upon presence of a pressure drop within the pipe, said valve comprising a tubular body having one end adapted to be affixed to and in communication with the pipe, and an other end provided with inner and outer concentric valve seats, a cap mounted on the other end encompassing said valve seats and forming a valve chamber, a substantially flat ring shape disk mounted for movement within said valve chamber toward and away from said valve seats, said disk being formed of rigid material, a single annular concentric rib formed on said disk intermediate the radial extent of said disk, and ribs extending radially inwardly from said disk to a central support.*

*20. An air admittance valve as in claim 19 further comprising an elastomeric sealing member between said disk and said valve seats for maintaining sealing engagement with said valve seats during an increase in pressure within the pipe and said valve chamber, said elastomeric sealing member being affixed to said disk for movement therewith.*

*21. An air admittance valve as in claim 20 wherein said central support comprises a ring having a central aperture.*

* * * * *